United States Patent
Davie et al.

(10) Patent No.: US 7,277,944 B1
(45) Date of Patent: Oct. 2, 2007

(54) TWO PHASE RESERVATIONS FOR PACKET NETWORKS

(75) Inventors: Bruce S. Davie, Belmont, MA (US); David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 778 days.

(21) Appl. No.: 09/871,119

(22) Filed: May 31, 2001

(51) Int. Cl.
*G06F 15/173* (2006.01)
*H04L 12/28* (2006.01)

(52) U.S. Cl. .................... 709/226; 709/238; 370/395.4

(58) Field of Classification Search ............... 709/219, 709/226, 238, 239; 370/229, 252, 395.4
See application file for complete search history.

(56) References Cited

U.S. PATENT DOCUMENTS

| | | | |
|---|---|---|---|
| 6,091,709 A | 7/2000 | Harrison et al. | |
| 6,167,445 A | 12/2000 | Gai et al. | |
| 6,205,465 B1 | 3/2001 | Schoening et al. | |
| 6,226,788 B1 | 5/2001 | Schoening et al. | |
| 6,275,574 B1 | 8/2001 | Oran | |
| 6,286,052 B1 | 9/2001 | McCloghrie et al. | |
| 6,449,251 B1 * | 9/2002 | Awadallah et al. | 709/235 |
| 6,453,349 B1 * | 9/2002 | Kano et al. | 709/226 |
| 6,744,767 B1 * | 6/2004 | Chiu et al. | 370/395.21 |
| 6,760,774 B1 * | 7/2004 | Soumiya et al. | 709/233 |
| 6,862,288 B2 * | 3/2005 | Sharma et al. | 370/403 |

OTHER PUBLICATIONS

VoIP Call Admission Control Using RSVP, Cisco Systems Incorporated, San Jose, CA, 1992-2002, 1-16.*
VoIP Call Admission Control Using RSVP; Cisco Systems (1992-1999).*
RSVP; Nokia Telecommunications; Jappila, Petri (1999).*
VoIP Call Admission Control Using RSVP, Cisco Systems Incorporated, San Jose, CA, 1992-2002, 1-16.
Braden et al., Resource ReSerVation Protocol (RSVP), Request For Comments (RFC) 2205, Internet Engineering Task Force, Network Working Group, http://www.ietf.org, Sep. 1997, 1-112.

* cited by examiner

*Primary Examiner*—Jason Cardone
*Assistant Examiner*—Tanim Hossain
(74) *Attorney, Agent, or Firm*—Cesari and McKenna LLP

(57) ABSTRACT

A two phase reservation mechanism for use with computer networks carrying voice or other time or bandwidth sensitive traffic. During the first or "resource allocation" phase, network resources sufficient to support the anticipated voice traffic are set aside within the computer network along the route between the sourcing entity and receiving entity. Although the network resources have been set aside, they are specifically not made available to the voice traffic, until the second phase of the reservation mechanism, called the "resource available" phase. During the resource available phase, the network resources that were previously set aside are now made available to the voice traffic.

36 Claims, 8 Drawing Sheets

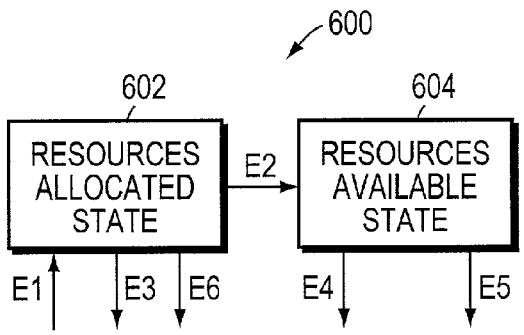

FIG. 6

| EVENT | DESCRIPTION | |
|---|---|---|
| E1 | TWO PHASE RESERVATION FLAG OF RECEIVED RSVP RESV MESSAGE IS ASSERTED AND RESERVATION PASSES ADMISSION CONTROL | 702 |
| E2 | TWO PHASE RESERVATION FLAG OF RECEIVED RSVP RESV MESSAGE IS DEASSERTED AND MATCHING RESERVATION WAS IN RESOURCES ALLOCATED STATE | 704 |
| E3 | FIRST TIME-OUT PERIOD EXPIRES | 706 |
| E4 | SECOND TIME-OUT PERIOD EXPIRES PRIOR TO RECEIPT OF RSVP RESV THAT REFRESHES THE RESOURCES ALLOCATED STATE | 708 |
| E5 | RSVP TEARDOWN MESSAGE IDENTIFYING THE CORRESPONDING RESERVATION IS RECEIVED | 710 |
| E6 | RSVP TEARDOWN MESSAGE IDENTIFYING THE CORRESPONDING RESERVATION IS RECEIVED | 712 |

FIG. 7

TWO PHASE RESERVATIONS FOR PACKET NETWORKS

BACKGROUND OF THE INVENTION

1. Field of the Invention

This invention relates to computer networks and, more specifically to the reservation of bandwidth in computer networks.

2. Background Information

Computer networks typically comprise a plurality of interconnected entities. An entity may consist of any device, such as a computer or end station, that "sources" (i.e., transmits) or "sinks" (i.e., receives) datagrams (e.g., packets and/or frames). A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information between a plurality of LANs or end stations. Bridges and switches may operate at various levels of the communication protocol stack. For example, a switch may operate at layer 2 which, in the Open Systems Interconnection (OSI) Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to whom the message is being sent, referred to as the destination address. To perform the switching function, layer 2 switches examine the MAC destination address of each data frame received on a source port. The frame is then switched onto the destination port(s) associated with that MAC destination address.

Other network devices, commonly referred to as routers, may operate at higher communication layers, such as layer 3 of the OSI Reference Model, which in Transmission Control Protocol/Internet Protocol (TCP/IP) networks corresponds to the IP layer. Data frames at the IP layer also include a header which contains an IP source address and an IP destination address. Routers or layer 3 switches may re-assemble or convert received data frames from one LAN standard (e.g., Ethernet) to another (e.g. token ring). Thus, layer 3 devices are often used to interconnect dissimilar subnetworks.

Voice over IP (VoIP)

Traditionally, computer networks were used to exchange static files or data, such as text and spreadsheet files, while the Public Switched Telephone Network (PSTN) was used to exchange voice information. Computer networks, however, are increasingly being used to transport "voice" information. Voice over IP (VoIP) typically refers to a group of technologies used to transmit voice information over computer networks. Such networks include a plurality of voice agents that convert voice information from its traditional telephony form to a form suitable for packet transmission. In other words, the voice agent encodes, compresses and encapsulates the voice information into a plurality of data packets. Examples of voice agents include IP telephones, VoIP gateways, certain private branch exchanges (PBXs), etc. A calling party uses a voice agent to initiate a VoIP call. Once the voice information has been converted into packet format, it is carried by the computer network to a second voice agent configured to serve the called party. Voice traffic, unlike static data files or records, is highly sensitive to delay and to lost packets. That is, delays in receiving data packets carrying voice information at the called party's voice agent can seriously degrade the quality of the call. Accordingly, packets carrying voice information must be delivered to the called party with high probability and in a timely manner.

Computer networks include numerous services and resources for use in forwarding network traffic. For example, different network links, such as Fast Ethernet, Asynchronous Transfer Mode (ATM) channels, SONET links, satellite links, etc., offer different speed and bandwidth capabilities. Particular intermediate devices also include specific resources or services, such as priority queues, filter settings, traffic shapers, queue selection strategies, congestion control algorithms, etc. that affect the rate at which traffic moves through the device and thus across the network. Depending on the selection or allocation of such resources or services, network traffic for different sources and sinks can be forwarded at different speeds or rates, thereby controlling the loss and/or delay experienced by the traffic.

The Resource Reservation Protocol

As set forth above, to support VoIP, packets carrying voice information must typically be delivered within narrow time constraints. Although many computer networks have the resources and services to meet the delivery requirements of VoIP, these resources and services must be allocated, preferably in advance, to the correct network traffic. The Resource reSerVation Protocol (RSVP), which is set forth at RFC 2205, is a signaling protocol that was developed so that entities (typically referred to as receivers) could reserve bandwidth within their computer networks to receive from one or more sourcing entities a desired traffic flow, such as multimedia stream. Pursuant to RSVP, sources send RSVP Path messages identifying themselves and indicating the bandwidth needed to receive their programming or content. These messages proceed hop-by-hop through the intermediate network devices, making those devices aware of the possibility that a reservation of resources may be required. If a receiver is interested in the programming or content offered by a particular source, it responds with a RSVP Reservation (Resv) message, which travels hop-by-hop back to the source. At each hop, the corresponding intermediate device establishes a session for the receiver and sets aside sufficient resources to provide the requested bandwidth for the desired traffic flow. These resources are immediately made available to the traffic flow. If the resources are not available, the reservation is refused explicitly so that the receiver knows it cannot depend on the corresponding resources being devoted to its traffic. By using RSVP, packets carrying voice information can be accorded the resources and services they need to ensure timely delivery.

In voice applications, RSVP is typically utilized to reserve network resources before the called party's phone begins ringing. Doing so has the advantage of not disturbing a called party when the resources to support acceptable voice quality are not available. However, pre-reserving resources creates potential problems. For example, an attacker could make use of those reserved resources without ever causing the signal that starts the billing cycle to be sent, e.g., the picking up of the phone by the called party. The attacker can thus "consume" valuable network resources without ever having to pay or otherwise be accountable for them. In fact, the "attacker" can be one or both of the calling and/or the called party, opening up a particularly serious theft-of-service capability known as "toll fraud" in the legacy telecommunications sector.

SUMMARY OF THE INVENTION

Briefly, the invention relates to a two phase reservation mechanism for use with computer networks carrying voice or other time-sensitive or high bandwidth information. During the first phase, called the "resource allocation" phase, network resources sufficient to support the anticipated voice traffic are set aside within the computer network along the entire route between the calling party and called party. Although the network resources have been set aside, they are specifically not made available to the voice traffic for which they were reserved, until the second phase of the reservation mechanism, called the "resource available" phase. During the resource available phase, the network resources that were previously set aside are now made available for application to the voice traffic. In other words, it is only after the resource available phase that the allocated network resources can be utilized by the voice traffic.

According to the illustrative embodiment, an intermediate network device along the route between the calling and the called parties includes a reservation engine, a packet classification engine, an admission control entity, and a traffic scheduler. The reservation engine preferably operates in accordance with the Resource reSerVation Protocol (RSVP) specification standard and includes an RSVP message generator and an RSVP state machine engine. To reserve network resources sufficient to carry the voice traffic between the calling and the called parties, one or more RSVP Path messages are sent across the computer network from the calling party to the called party. The Path messages follow a particular route through the computer network. In response to the Path messages, one or more first RSVP Resv messages are returned from the called party to the calling party following the inverse of the route taken by the Path messages. The first Resv messages specify the bandwidth that is being requested to support the voice traffic and a set of parameters or "classification criteria" for use in identifying that traffic. The first Resv messages also carry a two phase reservation flag, which is preferably asserted.

The RSVP engine of the intermediate device is configured to examine the two phase reservation flag and, if it is asserted, to enter the resource allocation phase. In the resource allocation phase, the RSVP engine contacts the admission control entity to determine whether the reservation request represented by the Resv message should be accepted or rejected. If the reservation request is accepted, the RSVP engine sets aside sufficient network resources to support the reservation request and directs the state machine to enter a resources allocated state for this reservation request. The RSVP engine does not, however, direct the traffic scheduler to apply these resources to the network traffic identified in the Resv message. Alternatively, the RSVP engine may direct the traffic scheduler to discard such packets or to give them poorer service than other traffic in order to discourage the transmission of network messages while in the resources allocated state which typically precedes the start of the billing cycle.

Next, one or more second Resv messages are sent from the called party to the calling party. In the second Resv message, the two phase reservation flag is deasserted. Again, the RSVP engine of the intermediate device examines the two phase reservation flag of these Resv messages. In response to the flag being deasserted, the RSVP engine directs the state machine to transition from the resources allocated state to a resources available state. It is in this state that the RSVP engine directs the packet classifier and the traffic scheduler to look for and identify network traffic matching the criteria specified in the Resv messages, and to make the allocated resources available to the network traffic matching those criteria. By separating the allocation of network resources into two phases, the present invention provides more precise control over the allocation and use of such references. Furthermore, resources are not actually made available for use until an appropriate point in the process, e.g., when the called party actually picks up the "phone". It also provides a more precise opportunity to start a corresponding billing cycle.

BRIEF DESCRIPTION OF THE DRAWINGS

The invention description below refers to the accompanying drawings, of which:

FIG. 6 is a state diagram in accordance with the present invention; and

FIG. 7 is an event table in accordance with the present invention.

DETAILED DESCRIPTION OF AN ILLUSTRATIVE EMBODIMENT

Figure 1:
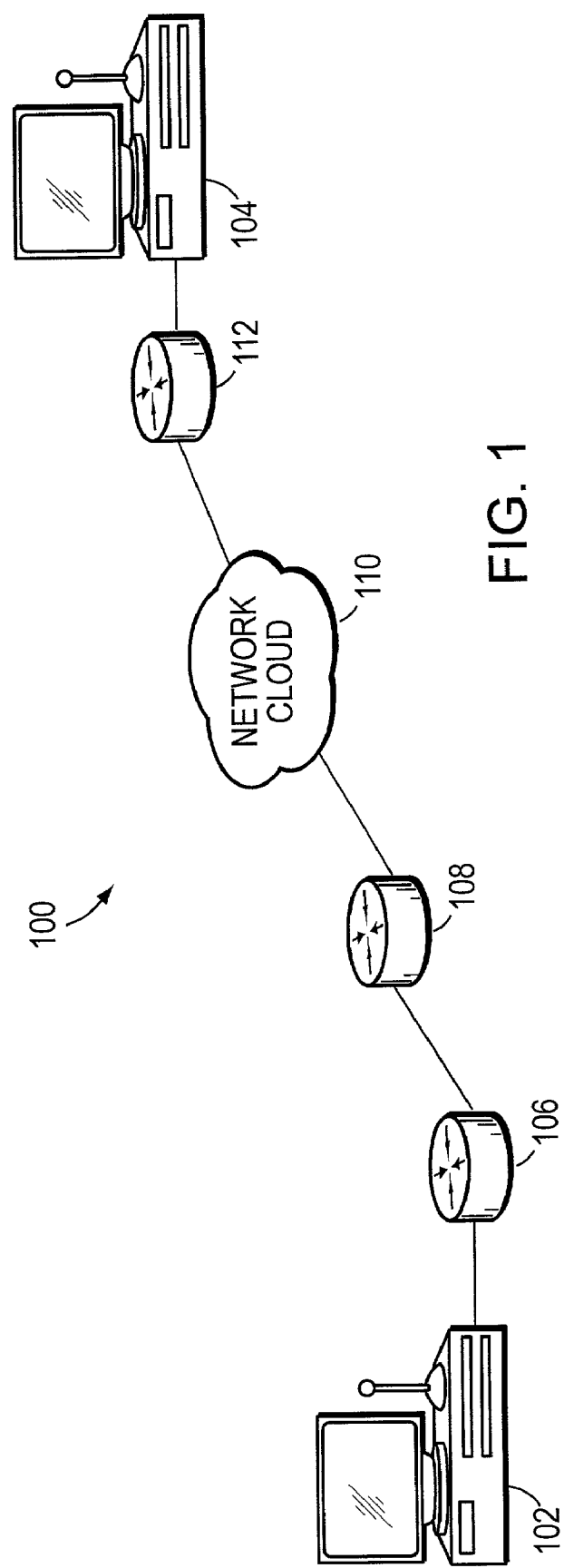
FIG. 1 is a highly schematic diagram of a computer network.

FIG. 1 is a highly schematic diagram of a computer network 100. The network 100 includes first and second voice agents 102, 104 that are interconnected by a plurality of intermediate network devices. More specifically, first voice agent 102 is coupled to a first hop network device, such as router 106, which, in turn, is coupled to a second network device, such as router 108. Router 108, in turn, is coupled to a network cloud 110. The network cloud 110 may consist of a plurality of network devices, local area networks (LANs), and end stations. Second voice agent 104 is similarly coupled to a first hop network device, such as router 112, which, in turn, is coupled to network cloud 110.

Figure 2:
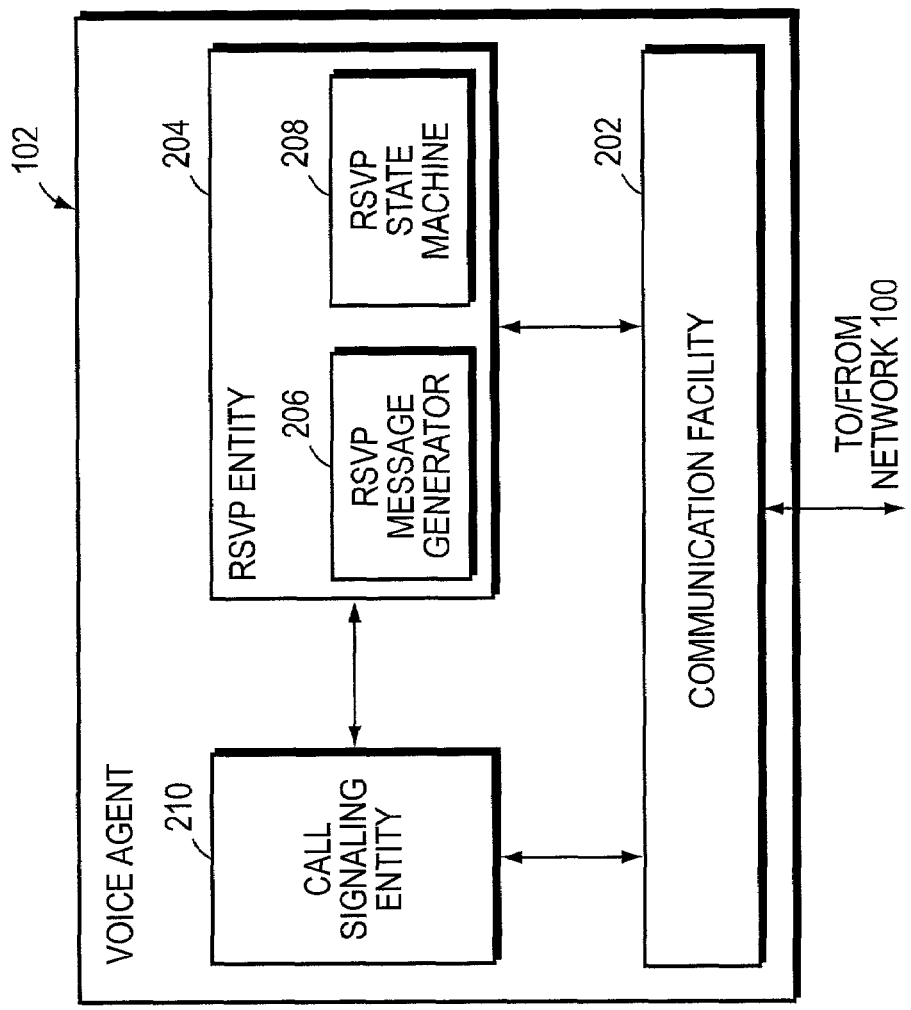
FIG. 2 is a highly schematic block diagram of a voice agent in accordance with the present invention.

FIG. 2 is a highly schematic, partial block diagram of a voice agent, such as voice agent 102. Voice agent 102 preferably includes a communication facility 202 and one or more resource reservation components, such as a Resource reSerVation Protocol (RSVP) entity or engine 204. As described herein, the RSVP entity 204, which includes a RSVP message generator 206 and a RSVP state machine engine 208, operates, in part, in accordance with the RSVP specification standard, which is set forth at RFC 2205 and is hereby incorporated by reference in its entirety. Voice agent 102 further includes a call signaling entity 210 in communicating relationship with the RSVP entity 204 and communication facility 202. Entity 210 operates in accordance with a signaling protocol, such as H.323, Session Initiation Protocol (SIP), Media Gateway Control Protocol (MGCP) or MEGACO, which is an extension of MGCP. The RSVP entity 204 is also in communicating relationship with the communication facility 202, and can thus exchange information, including network packets and frames with facility 202.

The communication facility 202 preferably includes one or more software libraries for implementing a communication protocol stack allowing voice agent 102 to exchange messages with other entities of network 100, such as voice agent 104. The communication facility 202 may, for example, include software layers corresponding to the Transmission Control Protocol/Internet Protocol (TCP/IP), although other communication protocols, such as Asynchronous Transfer Mode (ATM) cells, the Internet Packet Exchange (IPX) protocol, the AppleTalk protocol, the DEC-Net protocol and/or NetBIOS Extended User Interface (Net-BEUI) could be utilized. Communication facility 202 further includes transmitting and receiving circuitry and components, including one or more network interface cards (NICs) that establish one or more physical ports for exchanging data packets and frames with router 106 to which it is connected.

In accordance with the preferred embodiment, voice agent 102 includes programmable processing elements (not shown), which may contain software program instructions pertaining to the methods of the present invention. Other computer readable media may also be used to store the program instructions.

Voice agents 102, 204 may be computer end stations, such as personal computers (PCs), running one or more communication applications that include RSVP support, such as Netmeeting from Microsoft Corp. of Redmond, Wash. Suitable computer platforms for use with the present invention are commercially available from Dell Computer Corp. of Round Rock, Tex., and Compaq Computer Corp. of Houston, Tex.

Figure 3:
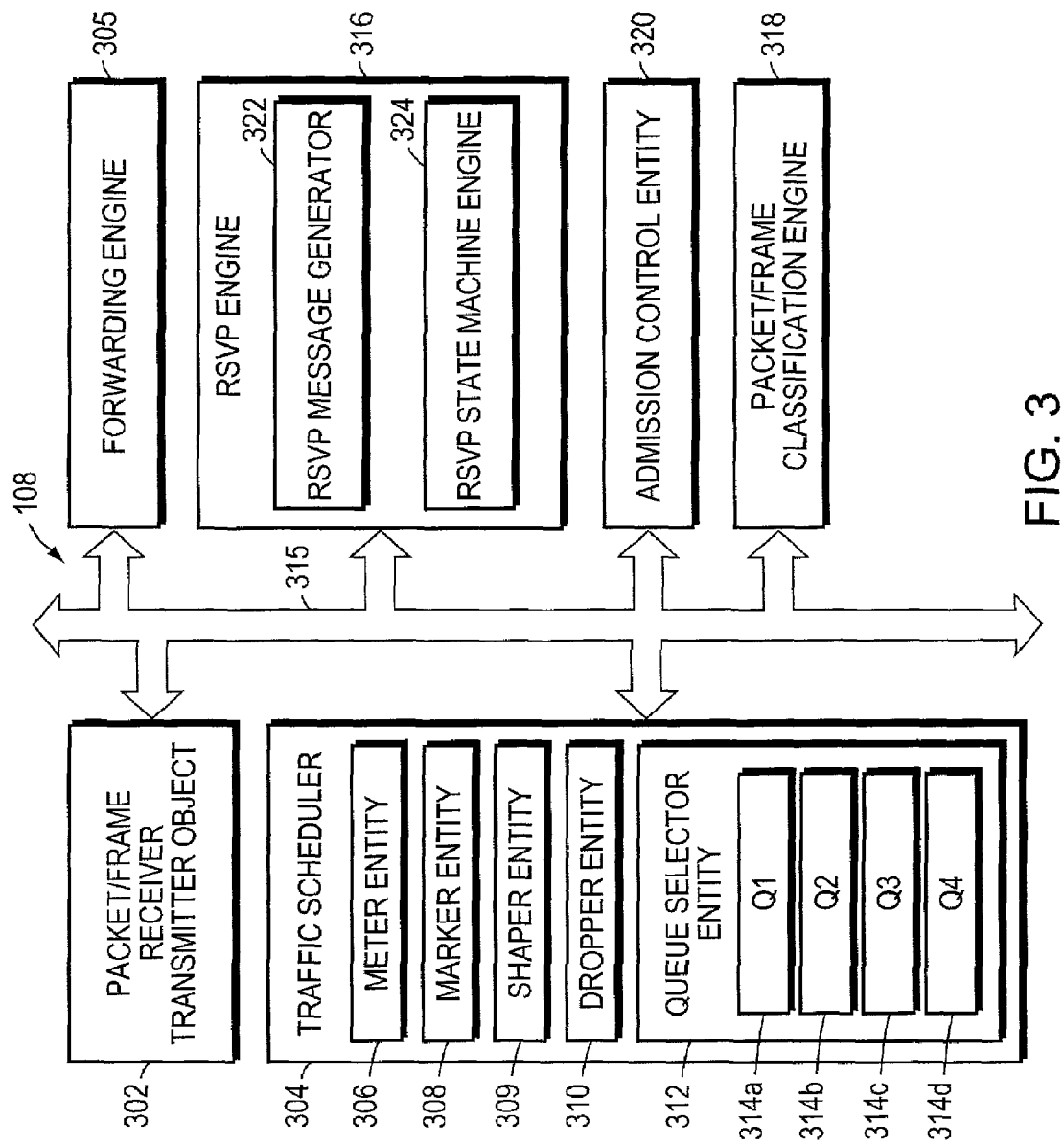
FIG. 3 is a highly schematic block diagram of an intermediate network device in accordance with the present invention.

FIG. 3 is a highly schematic, partial, functional block diagram of an intermediate network device in accordance with the present invention, such as router 106, which is the first hop router from voice agent 102. Router 106 preferably includes a packet/frame receiver transmitter object 302, a traffic scheduler 304, and a forwarding engine 305. The traffic scheduler 304 includes a plurality of resources or services that are used by router 106 to forward packets. For example, scheduler 304 may include one or more metering entities 306, one or more marker entities 308, one or more shaper entities 309, one or more dropper entities 310, and one or more queue selector entities 312. The queue selector entity 312, moreover, includes or has access to a plurality of queues 314*a-d* which buffer packets for the interfaces and/or ports that have been configured at router 106. The packet/frame receiver transmitter object 302 is configured as one or more interfaces or ports for receiving and sending network messages for router 106. The packet/frame receiver transmitter object 302, the traffic scheduler 304, and forwarding engine 305 are in communicating relationship with each other via one or more bus structures, such as system bus 315, so that network messages as well as commands may be exchanged between them.

Router 106 further includes one or more resource allocation and reservation components. In the preferred embodiment, router 108 includes a RSVP entity or engine 316, a packet/frame classification engine 318, and an admission control entity 320. The RSVP engine 316, moreover, includes an RSVP message generator 322 and an RSVP state machine engine 324, and also operates, in part, in accordance with the RFC 2205 specification standard. Router 106 also includes programmable processing elements (not shown), which may contain software program instructions pertaining to the methods of the present invention. Other computer readable media may also be used to store the program instructions.

A suitable platform for router 106 is the 7200 or 4700 series of routers from Cisco Systems, Inc. of San Jose, Calif. Nonetheless, those skilled in the art will recognize that the present invention, or parts thereof, may be implemented in other network devices and/or entities.

Figure 4A:
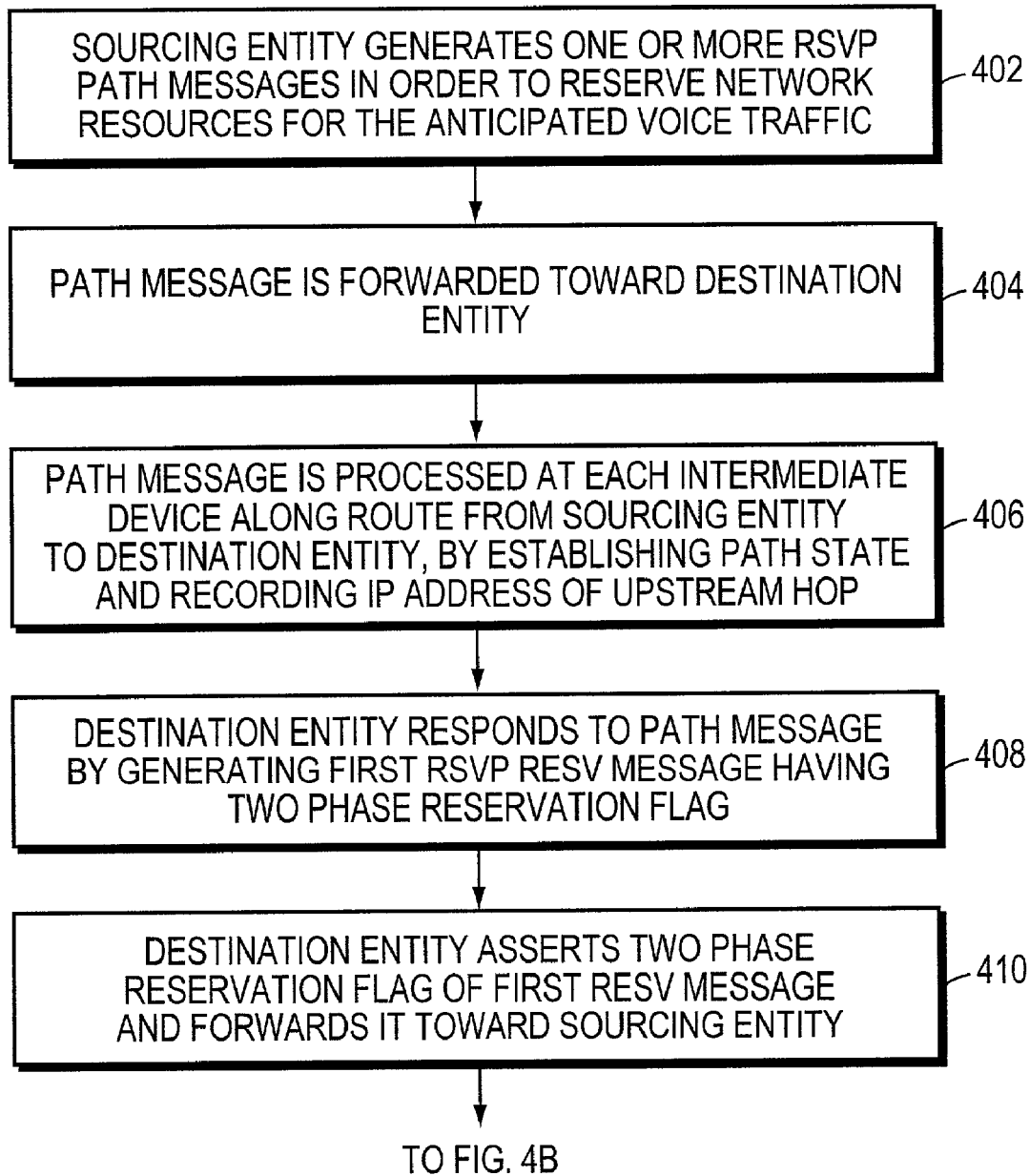
FIGS. 4A-C is a flow diagram of the preferred method of the present invention.
Figure 4B:
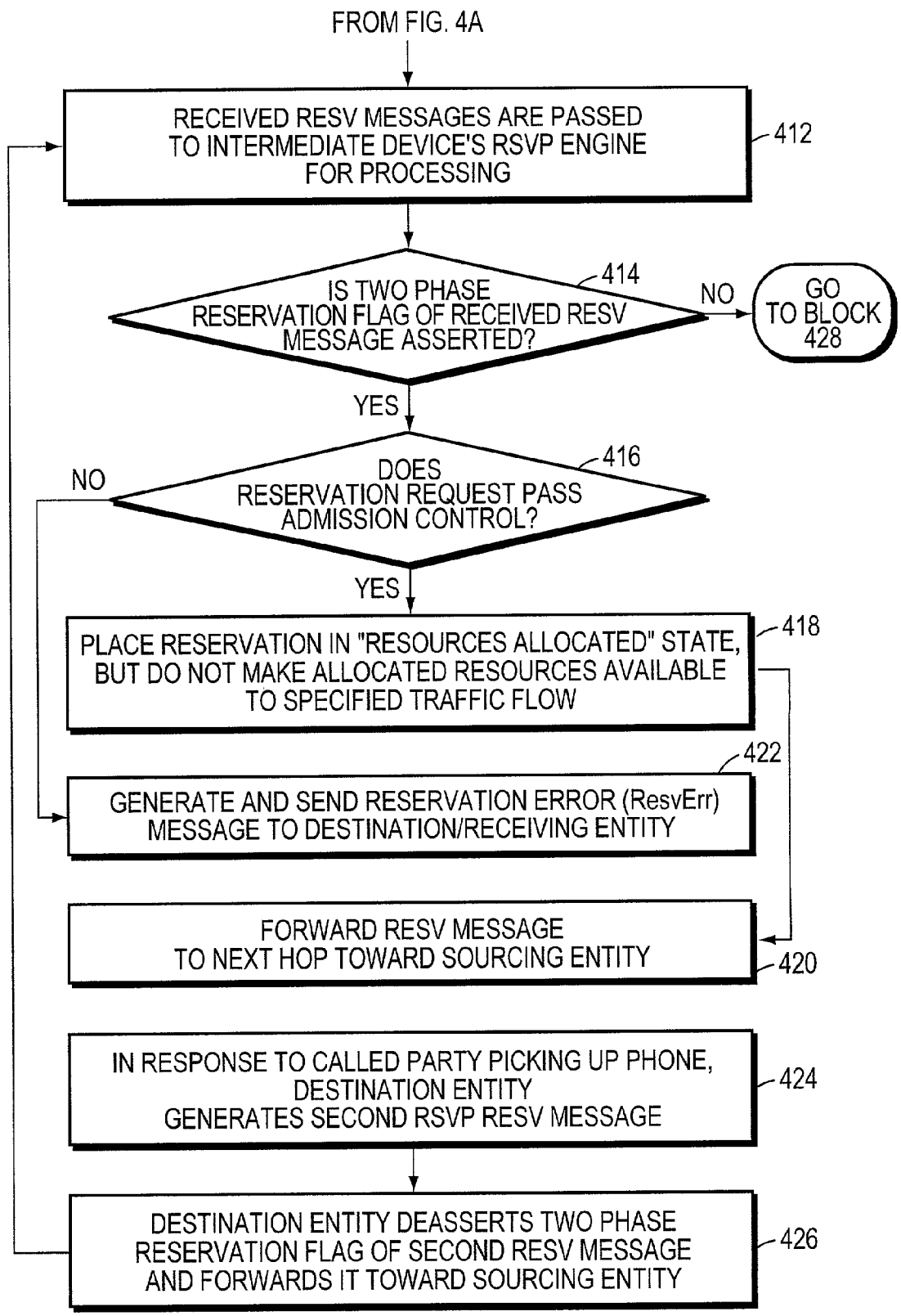
Figure 4C:
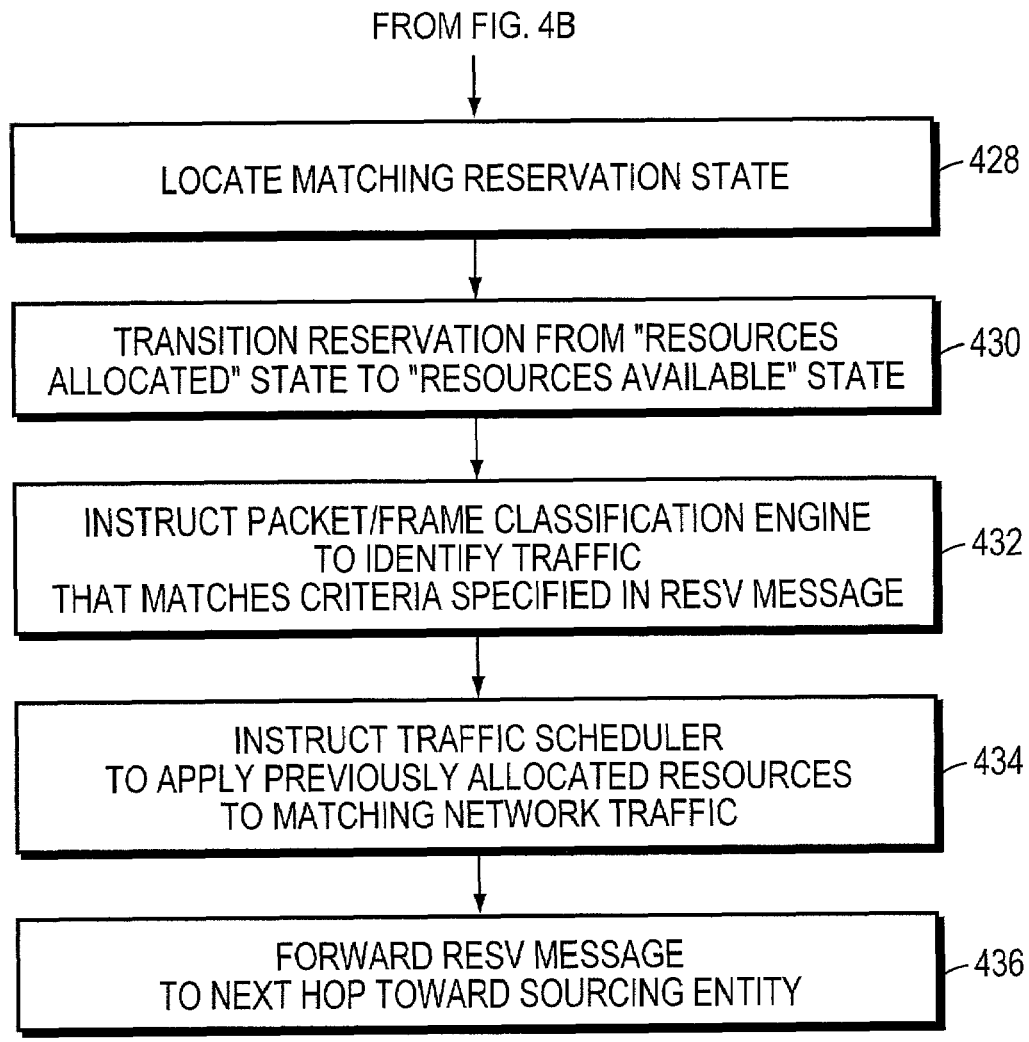

FIGS. 4A-C is a flow diagram of the method of the present invention. Suppose, for example, that a calling party utilizes voice agent 104 to place a call to a called party at voice agent 102. The calling party may enter a series of numbers at voice agent 104 that identify voice agent 102. To insure that the anticipated voice traffic from voice agent 104 is forwarded through the computer network 100 in a timely manner, i.e., with minimal delay, voice agent 104 (in cooperation with agent 102 as described below) preferably causes sufficient resources to be reserved across the network 100 to meet the time constraints of voice traffic. Specifically, the RSVP message generator 206 of RSVP entity 204 at voice agent 102 formulates one or more RSVP Path messages, as indicated at block 402 (FIG. 4A). The signaling entity 210 may initiate this process by issuing an Application Programming Interface (API) system call to RSVP entity 204 directing it to allocate resources to the call.

As provided in the RSVP specification standard, each RSVP Path message includes a header, a sender template object, and a sender Tspec object, each of which comprises a plurality of fields. The sender template object specifies the Internet Protocol (IP) address and Transmission Control Protocol/User Datagram Protocol (TCP/UDP) source port of the sending entity, i.e., voice agent 104. The sender Tspec object describes characteristics of the traffic to be generated by the sending entity, including the bandwidth required to support its delivery.

The Path message is then passed to the voice agent's communication facility 202 for transmission toward voice agent 102 via network 100, as indicated at block 404. The Path message is first received at router 112, which consults a routing table (not shown) to determine the next hop for the Path message. At each hop along the route to voice agent 102, including router 112, the respective intermediate network device processes the Path message, as indicated at block 406. In particular, the device establishes path state based on the contents of the message, and records the IP address of the upstream device, as also indicated at block 406. Each intermediate device also loads its IP address into a previous hop object that it adds to the Path message before forwarding it to the next intermediate network device along the route. Thus, when the Path message reaches its destination (e.g., voice agent 102), each intermediate network device along the route from the sourcing entity will have stored the address of the previous hop along the route so that it is able to forward messages back to the sourcing entity along the same route, but in the opposite direction. Voice agent 102 preferably responds to the Path message by generating one or more first RSVP Reservation (Resv) messages, as indicated at block 408.

Figure 5:
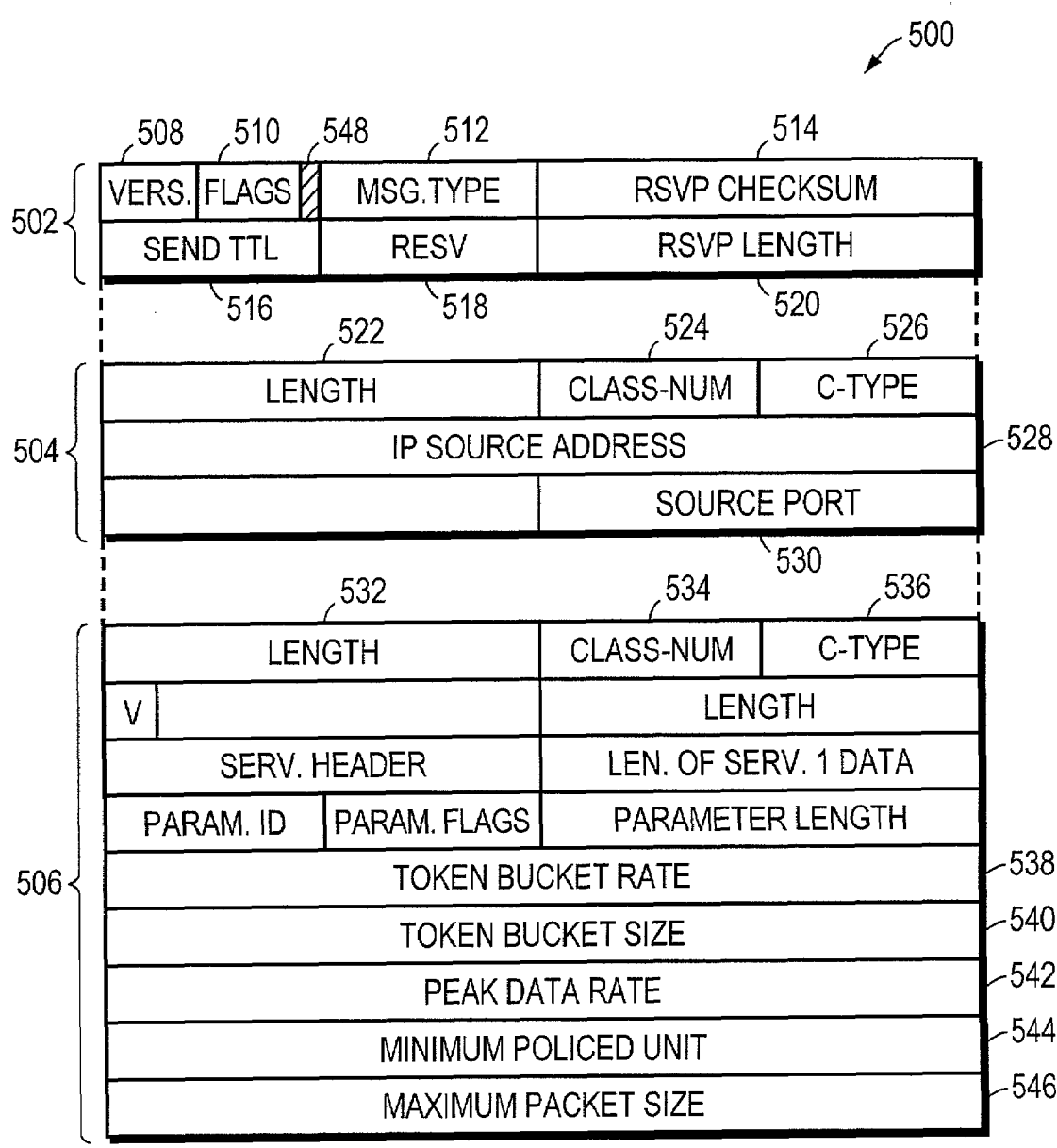
FIG. 5 is a highly schematic diagram of a reservation message in accordance with the present invention.

FIG. 5 is a schematic block diagram of a Resv message 500. The Resv message 500 includes a header 502, a filter spec object 504 and a flowspec object 506 each of which have a plurality of fields. In particular, the header 502 has a version field 508, a flags field 510, a message type field 512, an RSVP checksum field 514, a Send Time To Live (TTL) field 516, a reserved field 518 and an RSVP length field 520. Header fields 508, 512-516 and 520 are preferably loaded in a conventional manner. The filter spec object 504 has a length field 522 (loaded with the length of the respective object), a class number field (C-Num) 524 and a class type (C-type) field 526. It further includes an IP source address (SA) field 528, a source port number field 530 and may include one or more un-used fields. The RSVP message generator 206 at voice agent 102 loads the IP SA and source port fields 528, 530 with the IP address and TCP/UDP port of voice agent 104.

The flowspec object 506 also includes length 532, class number 534 and class type 536 fields. It further includes a token bucket rate field 538, a token bucket size field 540, a peak data rate field 542, a minimum policed unit field 544 and a maximum packet size field 546, among others. The RSVP message generator 206 loads fields 538-546 with values corresponding to the network resources, e.g., the bandwidth, that voice agent 102 requests to be reserved to support the anticipated voice traffic from voice agent 104. Typically, this bandwidth will be the same as that specified in the Path message.

Resv message 500 may include other objects, such as a session spec object that carries the IP address and TCP/UDP port number utilized by voice agent 102 to receive the traffic flow from voice agent 104.

In accordance with the present invention, the flags field 510 of the Resv header 502 is configured to include a 1-bit "two phase reservation" flag 548 (shown in hatch format), as also indicated at block 408. Voice agent 102 preferably asserts flag 548, as indicated at block 410. The first Resv message 400 travels hop-by-hop back to the source, e.g., voice agent 104, following the inverse of the route taken by the Path message. At each intermediate network device along the route, the first Resv message 500 is processed and a reservation state is established. In accordance with the present invention, there are at least two possible reservation states.

FIGS. 6 and 7 illustrate a state diagram 600 and an event table 700, respectively, in accordance with the present invention. As shown at FIG. 6, the two reservation states include: a resources allocated state 602, and a resources available state 604. As described below, a given reservation enters, transitions between and leaves these states in response to a plurality of events.

The first Resv message 500 is initially received at router 106. The packet/frame receiver transmitter object 302 of router 106 recognizes the received message as a Resv message and, accordingly, passes it to the RSVP engine 316 for processing, as indicated at block 412 (FIG. 4B). The RSVP engine 316 first examines the two phase reservation flag 548 of the received Resv message 500. In other words, the RSVP engine 316 determines whether the two phase reservation flag 548 is asserted or deasserted, as indicated at decision block 414. If the two phase reservation flag 548 is asserted, the RSVP engine 316 next performs admission control on the reservation request, as indicated by decision block 416. More specifically, using the contents of the flowspec spec object 506, the RSVP engine 316, queries the admission control entity 320 to determine whether router 106 has sufficient available resources to support the requested reservation. RSVP engine 316 may also determine whether or not the party making the reservation e.g., voice agent 102, has administrative permission to make the reservation specified in the RSVP Resv message 500.

Assuming the reservation represented by the Resv message 500 passes admission control, the RSVP engine 316 places the reservation in the resources allocated state 602, as indicated at block 418. That is, if the two phase reservation flag 548 of the Resv message 500 is asserted, and the reservation passes admission control at the respective device, the reservation enters the resources allocated state. This corresponds to event E1 702 (FIG. 7). The intermediate device then forwards the Resv message 500 to the next hop toward the sourcing entity, i.e., voice agent 104, as indicated at block 430. Accordingly, this process is preferably repeated at each intermediate device along the route from voice agent 104 to voice agent 102. That is, each network device along the route places the reservation in the resources allocated state 602 in response to the first Resv message 500.

Significantly, although network resources have been allocated at each of these intermediate devices, those resources are not yet made available to the voice traffic from voice agent 104, as indicated by block 418. Should voice agent 104 begin sending voice traffic to voice agent 102, the intermediate network devices will not utilize the allocated resources for this traffic because the reservation is still in the resources allocated state 602. Instead, the voice traffic will be forwarded pursuant to the intermediate network devices' "best efforts". Alternatively, the voice traffic may be discarded or given differentially poorer service by the intermediate devices. Nonetheless, because the resources have been allocated to the anticipated traffic flow from voice agent 104, they are not considered to be available in response to other reservation requests that may be received by the intermediate devices. Thus, subsequent reservation requests may fail admission control.

If in response to decision block 416, the reservation fails admission control, the RSVP message generator 322 formulates a reservation error (ResvErr) message and sends it back toward the destination/receiving entity, i.e., voice agent 102, as indicated at block 422. The receiving entity is thus informed that the requested reservation failed.

Assuming the reservation passes admission control at each node, when the called party answers the phone, or some other predefined action or event takes place, the previously allocated resources are then made available to the voice traffic. More specifically, in response to the called party accepting the call, i.e., interacting the with VoIP application, in this example NetMeeting, or, in the case of a VoIP phone, removing the handset from its cradle, voice agent 102 generates a second Resv message, as indicated at block 424. Again, call signaling entity 210 may initiate this process by issuing an API system call directing RSVP entity 204 of voice agent 102 to make the allocated resources available to the call. In the second Resv message 500, the RSVP entity 204 deasserts the two phase reservation flag 548, as indicated at block 426, which in all other respects is identical the first Resv message(s). The second Resv message 500 is similarly passed to communication engine 202 from where it is transmitted onto network 100 and forwarded hop-by-hop toward the sourcing entity, i.e., voice agent 104, as also indicted at block 426. At each intermediate device, such as router 106, the second Resv message is captured by the packet/frame receiver transmitter object 302 and passed to the RSVP engine 316, as indicated at block 412.

Again, the RSVP engine 316 determines whether the two phase reservation flag 548 is asserted, as indicated at decision block 414. In this case, the flag 548 is deasserted. Accordingly, processing jumps to block 428 (FIG. 4C), where the RSVP engine 316 matches the second Resv message with reservation state established in response to is the first Resv message. The RSVP engine 316 next directs the RSVP state machine engine 324 to transition the corresponding reservation state from the resources allocated state 602 to the resources available state 604, as indicated at block 430. The receipt of a Resv message 500 with the two phase reservation flag 548 deasserted corresponds to event E2 704 (FIG. 7). The RSVP engine 316 then instructs the packet/frame classification engine 318 to identify received traffic, i.e., packets, matching the classification criteria contained in the Resv message 500, such as the filter spec and session spec objects, as indicated at block 432, and directs the traffic scheduler 304 to apply the previously allocated resources to received traffic matching that criteria, as indicated at block 434. In other words, it is at this point that the RSVP engine 316 makes the previously allocated resources available for application to the traffic flow from voice agent 104. The receipt of a Resv message with the flag 548 deasserted may be interpreted by one or more of the intermediate network devices as a signal to start billing for the resources.

Router 106 then forwards the second RSVP Resv message 500 to the next hop toward voice agent 104, as indicated at block 436. This processing of the second Resv message is thus preferably repeated at each intermediate network device along the route to voice agent 104. Thereafter, the traffic flow from agent 104 to agent 102 is provided with sufficient resources to ensure timely, high quality delivery. As shown, with the present invention, the two phase reservation mechanism is preferably applied at each network device along the entire route between voice agents 102, 104, thereby providing end-to-end, two phase resource reservation.

When a reservation enters the resources allocated state 602, the state machine engine 324 may activate a timer or counter. If the reservation is still in the resources allocated state 602 after expiration of some preset time as determined by the timer or counter, the RSVP engine 316 may delete or teardown the reservation. That is, if a second Resv message with a deasserted two phase reservation flag 548 is not received within a predetermined time-out period, the reservation is discarded. This responds to event E3 706 (FIG. 7).

To maintain the reservation in the resources available state 604, voice agent 102 may periodically issue Resv messages 500 with the two phase reservation flag 548 deasserted, to refresh that state. In particular, when the reservation first transitions to the resources available state 604 (as well as each time that state is refreshed), a timer or counter may be initialized by the RSVP engine 316. If this counter or timer reaches a predetermined value prior to a subsequent Resv message being received (with the flag 548 deasserted), the reservation may be discarded, thereby releasing the previously allocated and available resources for assignment to another reservation. This corresponds to event E4 708 (FIG. 7).

A reservation in either the resources allocated or in the resources available states 602, 604 may also be discarded in response to a RSVP reservation teardown (ResvTear) message being received. ResvTear messages are typically issued by a receiving entity, e.g., voice agent 102, after the traffic flow for which the reservation was created is complete. The receipt of ResvTear messages corresponds to events E5 710 and E6 712 (FIG. 7).

Intermediate network devices that have not been configured to recognize a two phase reservation flag 548 preferably process the corresponding Resv message in a conventional manner, ignoring the value of flag 548. That is, these "legacy" devices perform admission control and reserve resources (and make them immediately available) in response to a first Resv message in which the two phase reservation flag is asserted. A second Resv message whose two phase reservation flag is deasserted will result the previously established reservation being refreshed. Thus, the present invention provides backwards compatibility.

Additionally, a voice agent could be configured in some situations to deassert the two phase reservation flag 548 in the first Resv message issued by the agent. An intermediate device receiving a first Resv message in which flag 548 is deasserted preferably performs admission control on the Resv message and, if the reservation request passes admission control, the device preferably makes the requested resources available to the specified traffic flow immediately.

Those skilled in the art will recognize that various modifications can be made to the present invention and still achieve its objectives.

For example, those skilled in the art will understand that the 1-bit two phase reservation flag 548 could alternatively be disposed in other locations of the Resv message. For example, it could be located in the reserved area 518 of the header 502, some other header field, or in one of the objects appended to the Resv message 500. A separate RSVP object could even be defined for carrying the two phase reservation flag 548.

It should further be understood that the present invention can be used with other reservation or signaling protocols besides RSVP. For example, the present invention can be advantageously used with ATM signaling protocols, such as Q.2931.

It should also be understood that a reservation of network resources preferably occurs from voice agent 102 to voice agent 104 to support the voice traffic flowing in this direction as well. This reservation process preferably occurs in the same manner as described above.

Other suitable voice agents include VoIP or Internet Telephones having RSVP support. Furthermore, a voice agent could be "built-in" an intermediate network device, such the 3600 series of routers with VoIP gateway support from Cisco Systems, Inc., which are configured to receive signals directly from a conventional analog telephone set. In this case, the intermediate network device would include a RSVP entity configured to insert a two phase reservation flag 548 into Resv messages generated by the device on behalf of the analog telephone set, and to assert/deassert that flag as described herein. A first hop intermediate network device may also be configured to act as a RSVP proxy for a corresponding VoIP telephone coupled to the device. In this case, the device would again include a RSVP entity configured to insert a two phase reservation flag into Resv messages generated on behalf of the VoIP telephone, and to assert/deassert that flag.

Also, it should be understood that the voice traffic described herein may be exchanged between multimedia terminal adapters coupled to cable modems, which, in turn, are connected to a cable network. In this case, the corresponding cable modem termination systems (CMTSs) would generate the first and second Resv messages carrying flag 548.

The foregoing description has been directed to specific embodiments of this invention. It will be apparent, however, that other variations and modifications may be made to the described embodiments, with the attainment of some or all of their advantages. For example, the present invention can be used with other time-sensitive or high bandwidth traffic flows besides voice, such as video or multimedia traffic flows. Therefore, it is an object of the appended claims to cover all such variations and modifications as come within the true spirit and scope of the invention.

What is claimed is:

1. A network device for use in a computer network carrying network traffic, the network device comprising:
   a traffic scheduler having one or more resources for use in forwarding network traffic received at the device at different rates;
   a classification engine configured to identify received network traffic based upon predefined criteria; and
   a resource reservation engine in communicating relationship with the traffic scheduler and the classification engine,
   wherein, in response to a first request to reserve resources for a given traffic flow from a destination entity, the resource reservation engine allocates one or more resources to the given traffic flow, but does not make the one or more allocated resources available to the given traffic flow until receiving a second request to reserve the one or more resources from the destination entity indicating that the destination entity accepts the traffic flow.

2. The network device of claim 1 wherein:
   the resource reservation engine utilizes a modified Resource reSerVation Protocol (RSVP) specification standard, and
   the first and second reservation requests are modified RSVP Reservation (Resv) messages.

3. The network device of claim 2 wherein:
   the first and second modified Resv messages each include a two phase reservation flag,
   in the first modified Resv message, the two phase reservation flag is asserted, and
   in the second modified Resv message, the two phase reservation flag is deasserted.

4. The network device of claim 1 wherein packets corresponding to the given traffic flow are forwarded by the device in a best efforts manner after receipt of the first request and prior to receipt of the second request.

5. The network device of claim 4 wherein packets corresponding to the given traffic flow are forwarded with the one or more allocated resources after receipt of the second request.

6. The network device of claim 1, further comprising:
   a timer to measure a predetermined time period, wherein the resource reservation engine discards the allocation of the one or more resources if the second reservation message is not received prior to expiration of the predetermined time period.

7. The network device of claim 1, wherein the traffic flow is a Voice over IP (VoIP) call to the destination entity.

8. The network device of claim 7, wherein that the destination entity accepts the VoIP call in response to removal of a handset from a cradle of the destination entity.

9. The network device of claim 7, wherein the destination entity accepts the VoIP call in response to interaction with a Voice Over Internet Protocol (VoIP) application on the destination entity.

10. The network device of claim 1, wherein the first and the second requests to reserve resources originate from the destination entity.

11. In a computer network having a plurality of entities interconnected by a plurality of intermediate network devices having one or more resources for use in forwarding network traffic, a method for providing end-to-end resource reservations along a route between two or more entities, the method comprising the steps of:
   receiving a first resource reservation message at a given intermediate network device disposed along the network route, the first resource reservation message from a destination entity, the first resource reservation message identifying a traffic flow between one or more entities and the destination entity, and requesting a reservation of resources;
   in response to receiving the first resource reservation message, allocating one or more of the device's resources for use in forwarding network traffic between the one or more entities and the destination entity; and
   withholding the one or more allocated resources from being applied to the traffic flow between the one or more entities and the destination entity, until the given intermediate network device receives a second resource reservation message from the destination entity, the second resource reservation message identifying the traffic flow and indicating that the destination entity accepts the traffic flow.

12. The method of claim 11 further comprising the step of:
   in response to receiving the second resource reservation message, making the one or more allocated resources available for use in forwarding the traffic flow between the one or more entities and the destination entity.

13. The method of claim 12 wherein the first and second resource reservation messages are modified Resource reSerVation Protocol (RSVP) Reservation (Resv) messages.

14. The method of claim 12 wherein the steps of allocating one or more of the device's resources, withholding the one or more allocated resources and making the one or more allocated resources available are performed at each intermediate network device disposed along the route between the two or more entities.

15. The method of claim 11, wherein the traffic flow is a Voice over IP (VoIP) call to the destination entity.

16. The method of claim 15, wherein that the destination entity accepts the VoIP call in response to removal of a handset from a cradle of the destination entity.

17. The method of claim 15, wherein the destination entity accepts the VoIP call in response to interaction with a Voice Over Internet Protocol (VoIP) application on the destination entity.

18. The method of claim 11, wherein the first and the second requests to reserve resources originate from the destination entity.

19. A method for providing resource reservations along a route through a computer network between two or more entities the method comprising the steps of:
   generating a first resource reservation message by a destination entity identifying a traffic flow and requesting a reservation of resources;
   configuring the first resource reservation message to include a first two phase reservation flag;
   asserting the first two phase reservation flag so that resources within the network will be allocated, but not made available to the identified traffic flow until the destination entity accepts the traffic flow
   generating a second resource reservation message by the destination entity identifying the traffic flow;
   configuring the second resource reservation message to include a second two phase reservation flag; and
   deasserting the second two phase reservation flag so that the allocated resources are made available for application to the identified traffic flow.

20. A router, comprising:
   means for receiving a first resource reservation message from a destination entity, the first resource reservation message identifying a traffic flow between one or more entities and the destination entity, the first resource reservation message requesting a reservation of resources;

means for allocating, in response to the first resource reservation message, one or more of the router's resources for use in forwarding network traffic between the one or more entities and the destination entity, but not making available the one or more router's resources to the identified traffic flow;

means for receiving a second resource reservation message from the destination entity; and means for making available, in response to the second resource reservation message, the one or more router's resources to the identified traffic flow.

21. A computer readable media having information written thereon, the information having instructions for execution on a processor for operating a router, the instructions for:

receiving a first resource reservation message from a destination entity, the first resource reservation message identifying a traffic flow between one or more entities and the destination entity, the first resource reservation message requesting a reservation of resources;

allocating, in response to the first resource reservation message, one or more of the router's resources for use in forwarding network traffic between the one or more entities and the destination entity, but not making available the one or more router's resources to the identified traffic flow;

receiving a second resource reservation message from the destination entity; and making available, in response to the second resource reservation message, the one or more router's resources to the identified traffic flow.

22. A method for operating a router, comprising:

receiving a first modified Resource reSerVation Protocol (RSVP) message transmitted by a destination entity to a source entity;

allocating resources between the source entity and the destination entity for a Voice over Internet Protocol (VoIP) call, in response to the first modified RSVP message, and not making the resources available;

receiving, as an indication of acceptance of the VoIP call by the destination entity, a second RSVP message from the destination entity; and making available the previously allocated resources for the VoIP call in response to receiving the second RSVP message.

23. The method of claim 22, further comprising:

including in the first and second RSVP message a phase reservation flag, the first RSVP message having an asserted phase reservation flag, the second RSVP message having a deasserted phase reservation flag, and when the phase reservation flag is deasserted, making available the resources that were previously allocated.

24. A router, comprising:

means for receiving a first modified Resource reSerVation Protocol (RSVP) message transmitted by a destination entity to a source entity;

means for allocating resources between the source entity and the destination entity for a Voice over Internet Protocol (VoIP) call, in response to the first modified RSVP message, and not making the resources available;

means for receiving, as an indication of acceptance of the VoIP call by the destination entity, a second RSVP message from the destination entity; and means for making available the previously allocated resources for the VoIP call in response to receiving the second RSVP message.

25. The router of claim 24, wherein the first modified RSVP message has an asserted phase reservation flag, the second modified RSVP message has a deasserted phase reservation flag, and the means for making available is responsive to when the reservation flag is deasserted.

26. An apparatus comprising:

a traffic scheduler having one or more resources for use in forwarding network traffic;

a resource reservation engine configured to receive a first resource reservation message from a destination entity, the first resource reservation message identifying a traffic flow between a source entity and the destination entity, the resource reservation engine, in response to the first resource reservation message, to direct the traffic scheduler to allocate the one or more resources to the traffic flow, but not make the one or more resources available to the traffic flow; and the resource reservation engine further configured to receive a second resource reservation message from the destination entity, the second resource reservation message identifying the traffic flow, the resource reservation engine, in response to the second resource reservation message, to direct the traffic scheduler to make the one or more resources available to the traffic flow.

27. The apparatus of claim 26 wherein the first resource reservation message and the second resource reservation message are modified Resource reSerVation Protocol (RSVP) Reservation (Resv) messages.

28. The apparatus of claim 26 wherein the first resource reservation message and the second resource reservation message each include a reservation flag.

29. The apparatus of claim 28 wherein the reservation flag of the first resource reservation message is asserted, and the reservation flag of the second resource reservation message is deasserted.

30. The apparatus of claim 26 wherein the traffic scheduler is further configured to discard at least some network traffic associated with the traffic flow, while the one or more resources are allocated to, but not available to, the traffic flow.

31. The apparatus of claim 26 wherein the traffic flow is a Voice over Internet Protocol (VoIP) call.

32. The apparatus of claim 31 wherein the source entity is associated with a calling party of the VoIP call, and the destination entity is associated with a called party of the VoIP call.

33. The apparatus of claim 26 wherein the one or more resources comprise a priority queue.

34. The apparatus of claim 26 wherein the one or more resources comprise a filter setting.

35. The apparatus of claim 26 wherein the one or more resources comprise a traffic shaper.

36. The apparatus of claim 26 wherein the one or more resources comprise a network link.

* * * * *